Figures 1, 2:
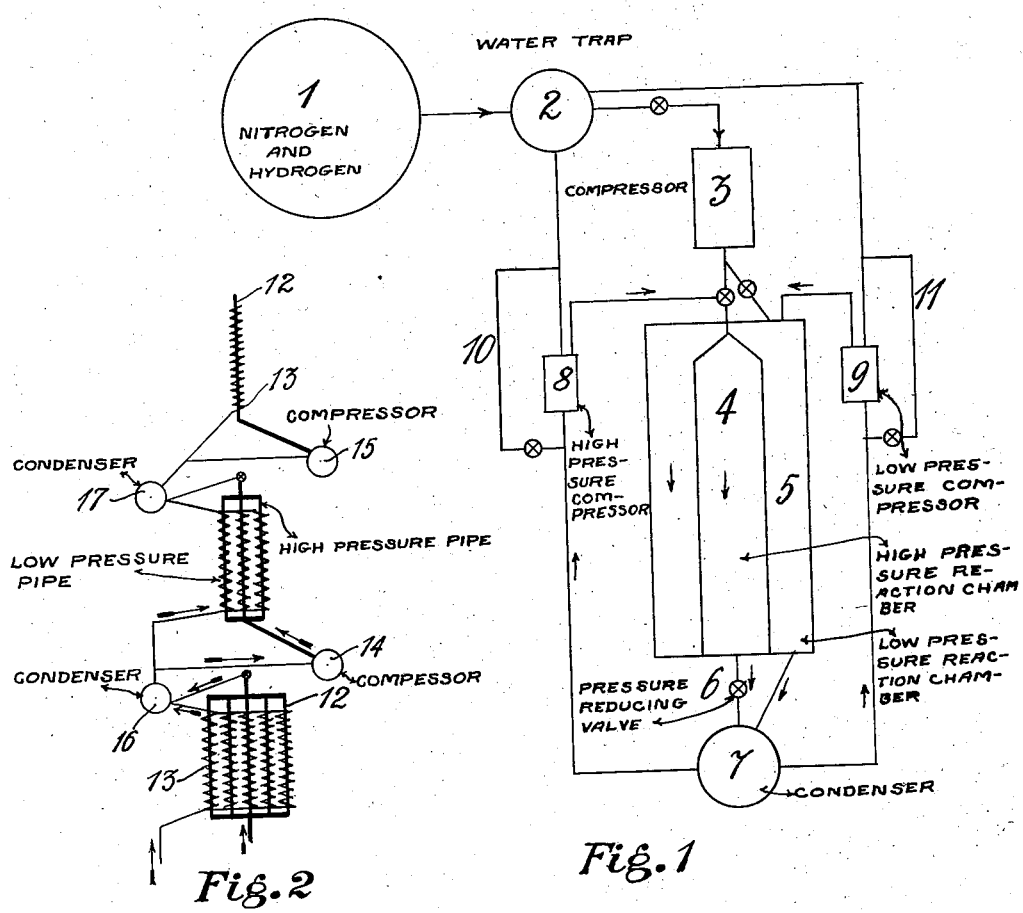

Jan. 19, 1926.  H. HARTER  1,570,485

SYNTHESIS OF AMMONIA BY MEANS OF CATALYSTS

Filed Feb. 11, 1925

Inventor:
Hans Harter
per
C. W. Fairbanks

Patented Jan. 19, 1926.

1,570,485

UNITED STATES PATENT OFFICE.

HANS HARTER, OF WURZBURG, GERMANY, ASSIGNOR TO ALBERT T. OTTO & SONS, OF NEW YORK, N. Y., A CORPORATION OF NEW YORK.

SYNTHESIS OF AMMONIA BY MEANS OF CATALYSTS.

Application filed February 11, 1925. Serial No. 8,331.

*To all whom it may concern:*

Be it known that I, HANS HARTER, a citizen of Germany, residing at Wurzburg, Germany, have invented certain new and useful Improvements in Synthesis of Ammonia by Means of Catalysts (for which I have filed application in Germany June 5, 1923), of which the following is a specification.

For the purpose of synthetically making ammonia by means of catalysts, two processes are well known, one of which is carried out at pressures up to 400 atmospheres and is known as the low-pressure system, and the other at pressures from 400 to 2000 atmospheres and is known as the high-pressure system. With the high-pressure process high ammonia concentrations are attained, but it involves a serious disadvantage inasmuch as excessive heat is produced which cannot be eliminated without great difficulty, and could not be utilized hitherto for the synthesis of ammonia itself. By the low-pressure process, on the other hand, generally only small ammonia concentrations are obtained, and hitherto it was impossible to completely remove the ammonia formed from the gas mixture, or this removal could not be effected in an economical way.

According to the present invention these two disadvantages, viz the excess of useless heat in the high-pressure process and the wasteful and incomplete separation of the ammonia in the low-pressure process, is avoided. To this end the two already known processes are combined to a single one.

In the accompanying drawing I have diagrammatically illustrated in Figs. 1 and 2, two forms of apparatus which may be employed in carrying out my invention.

In Fig. 1 of the drawing, 1 indicates the container for the hydrogen-nitrogen mixture, 2 is a water-separator, 3 the compressor, by which the gas mixture is forced into the high-pressure pipe 4 or into the low-pressure pipe 5. Through the pressure reducing valve 6 the gas is passed to the condenser 7 where it is combined with the gas coming from pipe 5. The remaining gas is returned by pump 8 to the high-pressure pipe or by pump 9 to the low-pressure pipe or it may be conducted to the compressor by means of pipes 10 and 11.

The high-pressure pipe, having, for instance, an inner diameter of 2 inches is provided in the usual manner with an interior heating device and filled with the catalyst. This high-pressure pipe, in which a pressure of say 600 atmospheres is maintained, is concentrically surrounded by the low-pressure pipe, in which a pressure of say 300 atmospheres is maintained, this pipe also being filled with catalytic substance. Thus two advantages are simultaneously attained, namely, the reaction-heat produced in the high-pressure pipe is transmitted by radiation to the catalyst of the low-pressure pipe; and the pressure acting upon the interior surface of the high-pressure pipe is reduced by the amount of the pressure in the low-pressure pipe. I attain not only an improved construction, but at the same time an increased safety in working and a certain saving of material in making the high-pressure cylinder.

The heat required for the low-pressure catalyst is regulated by controlling the pressure and the gas velocity in the high-pressure pipe. The catalyst is selected so that the reaction-heat produced at a pressure of say 600 atmospheres, suffices to heat the catalyst in the low-pressure pipe up to the required reaction-temperature. As, of course, the ammonia concentration rises corresponding to the pressure employed, I am able, by regulating the pressure in the high-pressure pipe, to restrict within the required limits, the output and the reaction-heat and thereby the heating of the low-pressure catalyst. The same result may be attained by providing different gas velocities in both contact chambers.

After leaving the contact pipes, both gas currents having a pressure of 300 or 600 atmospheres respectively are combined, and the ammonia formed is condensed by liquefaction. This can be effected by simple water-cooling means in the case of high pressure, but with low pressures cooling with water is not effective. Heretofore, in the low-pressure system the ammonia had to be absorbed by water or sulfuric acid, which method is troublesome, incomplete, dangerous and expensive. However, according to my invention I am able to condense the ammonia from both gas currents by simple cooling. For this purpose the pressure of the high-pressure gas current is reduced to the pressure of the gas in the low-pressure cylinder. By this reduction the gas mixture expands and is cooled down to such a degree that the concentrated ammonia contained in the united gas currents is immediately condensed as a liquid. In this way I am able to separate, by simple reduction of pressure, the ammonia from the high-pressure system. Of course it is possible to condense the ammonia from a plurality of combined apparatus by simultaneous reduction of the pressure of the single high-pressure currents to the pressure of the corresponding low-pressure currents in a cylinder of suitable size. To remove the last remnants of ammonia that might be left behind in the gas mixture, it is only necessary to conduct the gases, before they are introduced into the circulatory system or before they enter the next contact-chamber, into a cylinder filled with "silica gel." However, as a rule, a small quantity of ammonia in the gas mixture is advantageous, inasmuch as the temperatures in the low-pressure pipes are hereby kept within preferable low limits.

Supposing, in the high-pressure apparatus 80 of 100 volumes of the hydrogen-nitrogen mixture, and in the low-pressure apparatus 40 of 100 volumes of the gas mixture are converted into ammonia and both products are mixed, then the mixture will contain 60 volumes of hydrogen-nitrogen mixture or 42.8 per cent by volume of ammonia. The pressure being 300 atmospheres, the partial pressure of the ammonia amounts to 128.4 atmospheres, and by cooling down to ordinary temperature about 94 per cent of the ammonia will be condensed.

After the ammonia has been separated from the united gas currents at a pressure of 300 atmospheres by condensation in the above described manner, the residue of hydrogen and nitrogen which have not chemically combined in the contact members is again circulated through the low-pressure system whereas for the high-pressure system fresh gas mixture is sucked up from the container. However I may also proceed in another way. The united gas current, from which the ammonia has been separated, may be compressed from 300 to 600 atmospheres and returned into the high pressure system, whereas for the low-pressure system fresh quantities of gas are sucked up, whereupon the process is continued as above. Of course, the two combined processes (high-pressure and low-pressure synthesis) may be carried out not only in concentric cylinders, but also in separate apparatus, for instance, by effecting the low-pressure synthesis in a separate cylinder or in a worm or serpentine pipe instead of a jacket surrounding the high-pressure pipe. In this way, the easy removal of the ammonia is attained, but not the economic utilization of the reaction-heat for the ammonia synthesis itself.

My improved combined systems comprising high-pressure and low-pressure chambers may be connected in series. For this purpose a plurality of pairs of high- and low-pressure chambers, for instance, five or six, combined as above described, are connected in parallel. A plurality of such systems connected in parallel are connected in series, but so that the number of the elements in parallel connection, diminishes in proportion as the gas volume is diminished by the separation of ammonia. The number of the parallel tubes is to be calculated in such manner that the gas velocity in all systems connected in series remains approximately constant.

Between each two batteries the ammonia is removed from the gas mixture by combining the high-pressure and the low-pressure currents and simultaneously reducing the high pressure to low pressure.

In Fig. 2 of the drawing I have illustrated, by way of example, the connection of the pipes in the system last described. The high-pressure pipes 12 are indicated by heavier lines, the low-pressure pipes 13 surrounding the pipes 12 are indicated by lighter lines. 14, 15 are compressors for the high-pressure system, and 16, 17 are condensers for the low-pressure-system.

The processes hitherto known for connection in series employ either a very high pressure or, in the case of low pressures, a large number of tubes connected in series. With my new process I attain the same result with pressures up to 600 atmospheres instead of the pressure of 1000 atmospheres and more, as usually employed, and with only 2 or 3 batteries instead of from 20 to 30 batteries connected in series.

My new process may therefore be employed with especial advantage if, instead of pure hydrogen, impure gases, for instance, coke-oven waste-gases are to be utilized for ammonia synthesis.

I claim:—

1. Process of synthetically producing ammonia by means of catalysts, consisting in treating one part of a mixture of hydrogen and nitrogen with the catalyst at a pressure exceeding 400 atmospheres and another part of the said mixture at a pressure not exceeding 400 atmospheres, expanding the treated gas of higher pressure to lower pressure uniting the gases thus treated, and condensing and separating the ammonia formed.

2. Process of synthetically producing ammonia by means of catalysts, consisting in treating one part of a mixture of hydrogen and nitrogen with the catalyst at a pressure exceeding 400 atmospheres and another part of the said mixture at a pressure not exceeding 400 atmospheres, transmitting the excess of heat produced by the high pressure synthesis to the gas subjected to low pressure synthesis, expanding the treated gas of higher pressure to lower pressure uniting the gases thus treated, and condensing and separating the ammonia formed.

3. Process of synthetically producing ammonia by means of catalysts, consisting in treating one part of a mixture of hydrogen and nitrogen with the catalyst at a pressure exceeding 400 atmospheres and another part of the said mixture at a pressure not exceeding 400 atmospheres, expanding the treated gas of higher pressure to lower pressure uniting the gases thus treated with the reduction of the higher to the lower pressure, and condensing the ammonia formed.

4. Apparatus for synthetically producing ammonia by means of catalysts, comprising a catalytic chamber, means for supplying a gas mixture under a pressure exceeding 400 atmospheres to the said chamber, a second catalytic chamber and surrounding the first-named chamber, means for supplying a gas mixture under a pressure not exceeding 400 atmospheres to the said second chamber, means for withdrawing and uniting the gas mixtures from the said chambers, and means for condensing and separating the ammonia formed.

5. An apparatus for synthetically producing ammonia by means of catalysts, comprising a plurality of systems of catalytic chambers, means for supplying a gas mixture to said chambers under a pressure exceeding 400 atmospheres, the chambers of each system being connected in parallel and the systems being connected in series, the number of chambers in each system diminishing in proportion to the ratio of transformation of the gas mixture into ammonia, means between successive systems for separating the ammonia formed in the preceding system and thereby decreasing the volume of the gas mixture, a second system of catalytic chambers surrounding the first mentioned chambers, and means for delivering a gas mixture to said second system of chambers under a pressure not exceeding 400 atmospheres.

6. Apparatus for synthetically producing ammonia by means of catalysts, comprising a catalytic chamber adapted to sustain a pressure exceeding 400 atmospheres, means for supplying a gas mixture to the said chamber, a second catalytic chamber adapted to sustain a pressure up to 400 atmospheres, means for supplying a gas mixture to the said second chamber, means for withdrawing and uniting the gas mixtures from the said chambers, and means for condensing and separating the ammonia formed.

In testimony whereof I affix my signature.

HANS HARTER.